United States Patent
Wimmer

(10) Patent No.: US 7,327,309 B2
(45) Date of Patent: Feb. 5, 2008

(54) RADAR SCAN CONVERTER AND METHOD FOR TRANSFORMING

(75) Inventor: Michael Wimmer, Bremen (DE)

(73) Assignee: Barco Orthogon GmbH, Bremen (DE)

( * ) Notice: Subject to any disclaimer, the term of this patent is extended or adjusted under 35 U.S.C. 154(b) by 228 days.

(21) Appl. No.: 11/318,270

(22) Filed: Dec. 23, 2005

(65) Prior Publication Data

US 2007/0146197 A1    Jun. 28, 2007

(51) Int. Cl.
*G01S 7/04* (2006.01)

(52) U.S. Cl. .................. 342/185; 342/179; 342/197

(58) Field of Classification Search ................ 342/179, 342/185, 197
See application file for complete search history.

(56) References Cited

U.S. PATENT DOCUMENTS

| | | | |
|---|---|---|---|
| 4,002,827 A | | 1/1977 | Nevin et al. |
| 4,214,269 A | * | 7/1980 | Parker et al. ............... 348/442 |
| 5,067,019 A | | 11/1991 | Juday et al. |
| 6,192,164 B1 | * | 2/2001 | Park ........................... 382/300 |
| 6,212,132 B1 | * | 4/2001 | Yamane et al. ............. 367/180 |
| 6,621,451 B1 | * | 9/2003 | Fisher et al. ................ 342/185 |
| 2007/0146197 A1 | * | 6/2007 | Wimmer ..................... 342/185 |

FOREIGN PATENT DOCUMENTS

| | | | |
|---|---|---|---|
| GB | 2047040 A | * | 11/1980 |
| GB | 2 089 537 | | 6/1982 |
| WO | WO 2007073751 A1 | * | 7/2007 |

* cited by examiner

*Primary Examiner*—John B Sotomayor
(74) *Attorney, Agent, or Firm*—Seed IP Law Group PLLC

(57) ABSTRACT

A method transforms an image from polar coordinates into Cartesian coordinates. Therefore, the target image in Cartesian coordinates is subdivided into triangles defined by the vertices given in Cartesian coordinates. The respective polar coordinates are coded into attributes and these attributes are attached to each vertex. The attributes of any coordinates within the triangle are calculated by performing a bilinear interpolation on a graphics card and the polar coordinates are calculated from these attributes. Finally, the characteristics of the coordinates of the image in polar coordinates are transferred to the corresponding coordinates of the target image given in Cartesian coordinates. A method also consistently displays single ore multiple radar scan images with additional geographical data in one display plane. These methods may be performed by a computer program and implemented in a radar scan converter.

23 Claims, 4 Drawing Sheets

RADAR SCAN CONVERTER AND METHOD FOR TRANSFORMING

TECHNICAL FIELD

The present disclosure generally relates to a method for transforming a first image given in polar coordinates $r_i$, $\phi_i$ into a second image given in Cartesian coordinates $x_i$, $y_i$, or vice versa. More particularly but not exclusively, it relates to a method for displaying at least one radar scan image or video, composed of a plurality of radar scan images, given in polar coordinates and given in a first plane in a display plane. The disclosure also relates to a computer program for transforming a radar scan image or radar scan video given in polar coordinates into an image or video given in Cartesian coordinates or vice versa. And the present disclosure relates to a radar scan converter for transforming a radar scan image or radar scan video, given in polar coordinates into an image or video given in Cartesian coordinates or vice versa.

BACKGROUND INFORMATION

A transformation for transforming a first image given in polar coordinates into a second image given in Cartesian coordinates is particularly used for transforming a radar scan comprising radially scanned data, to be displayed on a regular (Cartesian) screen.

A radar scan system receives a plurality of pixels given in polar coordinates. Thus, the position of each data point is defined by an angle $\phi_i$ and a radius $r_i$. Each so defined data point comprises additionally data as color and brightness. This additional data can also be zero, indicating, that for the corresponding data point no object was scanned. But usually, all pixels comprise any additional data, since areas or points where no objects were scanned might be indicated by a background color and brightness. It is also very common, to have information representing a noise of the radar scan. A plurality of such pixels forms a first image, even though this plurality of pixels might not be displayed to this end.

For displaying this plurality of pixels or for executing any computation or analysis on this pixels a transformation into Cartesian coordinates is desirable. This desire is also grounded on the fact, that most common computation programs for graphics are based on graphics given in Cartesian coordinates. In particular, most display systems like computer screens driven by a graphics card are based on Cartesian coordinates, and thus the position of each pixel on the screen is defined by Cartesian coordinates $x_i$, $y_i$.

One way of transforming radar scan data received in polar coordinates into Cartesian coordinates for displaying is disclosed in the WO 2004/015442. This document is incorporated in the present disclosure by reference. For transforming the radar scan image or video, data of a radar scan is received by a radar antenna or receiver and from there transmitted to a radar data receiver. The received digitized radar data is directly stored into a memory (polar store). The stored radar data usually comprises an angle of the radar antenna and distance from the radar antenna as a position information for each pixel. Additionally at least one information which is e.g., representative for the intensity value of each pixel is stored with the data defining the position of the pixel. For transforming the stored radar data into an image defined by Cartesian coordinates x, y a transformation is basically transformed for each pixel. Therefore, for the Cartesian coordinates $x_i$, $y_i$ the respective polar coordinates $r_i$, $\phi_i$ are determined. For each thus determined polar coordinates $r_i$, $\phi_i$ the corresponding information (e.g., the intensity value) is searched in the polar store of the memory where the radar data is stored and this information is transferred and allocated to the corresponding pixel of the image given in Cartesian coordinates. This method is also called reverse scan conversion. For displaying the intensity value of the corresponding pixel might be transformed into a color, which corresponds to the corresponding intensity value according to a certain standard.

Often, the polar coordinates corresponding to the Cartesian coordinates are determined by reading them out of a look up table. For transforming, the corresponding polar coordinates must be received from this look up table for each Cartesian coordinates and thus for each pixel. Other methods may calculate the polar coordinates $r_i$, $\phi_i$.

The above described method has the disadvantage, that calculating the polar coordinates for each pixel or using a look up table to read out the polar coordinates for each pixel is very time consuming. Thus, using micro processors which are available nowadays it is a problem, to transform a radar scan image of regular size into an image given in Cartesian coordinates in real time. Also, executing this complex computations or accessing the look up table consumes a large amount of processor capacity. Often, look-up tables must be recalculated e.g., when a zoom-operation is performed, thus disabling the radar scan converter during the recalculation process. Thus, a powerful processor is needed to execute the transformation, which increases hardware costs. Additionally, only few capacity of the employed processor is leftover and thus available for additional jobs as controlling further input or output functions or running further applications on the processors.

Since known transformation techniques are quite time consuming it is also a problem, to display one or more radar scan images or videos of one or more radar antennas and possibly additional geographical data in one display plane. According to the state of the art radar scan images and videos and geographical data received from different display planes are displayed on one display by just shifting, rotating or zooming each image, not considering each geographical projection, thus resulting in distortions and discrepancies of the images.

BRIEF SUMMARY OF THE INVENTION

One embodiment of the present invention provides a method for improving the efficiency of transforming radar scan images given in polar coordinates into Cartesian coordinates.

For accomplishing the above, a method and device according to one or more embodiments of the present invention is disclosed.

One embodiment of the present invention provides a method for transforming a first image given in polar coordinates $r_i$, $\phi_i$ into a second image given in Cartesian coordinates $x_i$, $y_i$, or vice versa, comprising:

a. dividing at least part of the second image, into at least one triangular shaped area, having three vertices, defined by Cartesian coordinates $x_k$, $y_k$, b. determining for the Cartesian coordinates $x_k$, $y_k$ of the vertices of the second image polar coordinates $r_k$, $\phi_k$ of the first image, c. allocating first and second attributes $A_k$ and $B_k$ to the vertices $x_k$, $y_k$, wherein the first attribute $A_k$ is the product of $r_k$ and $\phi_k$ and wherein the second attribute $B_k$ equals $r_k$, d. calculating attributes $A_i$ and $B_i$ for at least one current coordinate pair $x_i$, $y_i$ of the second image from the attributes $A_k$, $B_k$ of the vertices $x_k$, $y_k$ of a triangular shaped area by an interpolation with respect to the position of the current coordinate pair $x_i$, $y_i$ relative to the vertices of the triangular shaped area, and e. calculating the angle $\phi_i$ of a current coordinate pair $r_i$, $\phi_i$ of the first image, corresponding to the current coordinate pair $x_i$, $y_i$ of the second image by dividing the first attribute $A_i$ by the second attribute $B_i$.

According to an embodiment of this method, data of a first image, which is to be transformed is received e.g., from a radar antenna and receiver. The data is representative for a first image given in polar coordinates $r_i$, $\phi_i$. For transformation, corresponding Cartesian coordinates $x_i$, $y_i$ is found for the polar coordinates $r_i$, $\phi_i$. This is performed, by starting with the second image given in Cartesian coordinates and dividing it into triangular shaped areas. Each of those triangular shaped areas comprises three vertices, which are defined by Cartesian coordinates $x_k$, $y_k$. In the next step polar coordinates $r_k$, $\phi_k$ are determined for the vertices $x_k$, $y_k$. This can be done e.g., by looking up the corresponding polar coordinates $r_k$, $\phi_k$ in a list comprising the Cartesian coordinates $x_k$, $y_k$ and the corresponding polar coordinates $r_k$, $\phi_k$. Thus, the list might comprised a column for pairs of Cartesian coordinates and a column for pairs of polar coordinates or the list might be formed as a matrix defined by the Cartesian coordinates and contain the polar coordinates as values.

A further possibility to determine the polar coordinates $r_k$, $\phi_k$ for the corresponding Cartesian coordinates $x_k$, $y_k$ is by calculating the polar coordinates of Cartesian coordinates by a known formula as follows:

$$r_k = \sqrt{x_k^2 + y_k^2}$$

$$\varphi_k = \begin{cases} \arccos\dfrac{x_k}{r_k} & \text{for } y_k \geq 0 \\ -\arccos\dfrac{x_k}{r_k} & \text{for } y_k < 0 \end{cases}$$

In general, executing a trigonometric computation might be somehow time consuming. But according to one embodiment of the invention, for only few vertices a computation using the mentioned trigonometric functions or using a look up table is executed.

A different way to determine the polar and Cartesian coordinates of the vertices is, to start in the first image, given in polar coordinates, thus dividing at least part of the first image into at least one triangular shaped area and transforming the vertices know given in polar coordinates into Cartesian coordinates. According to this, polar and Cartesian coordinates are determined for each vertices. The method can now proceed based on these coordinates of the vertices. This way of determining the coordinates of the vertices may also be used in any case, even though in this application determining the coordinates of the vertices is mainly described in a reverse transformation manner, starting with the Cartesian coordinates.

In the next step the product of $r_k$ and $\phi_k$ forms a first attribute $A_k$ and $r_k$ on its own forms a second attribute $B_k$. Thus the attributes $A_k$ and $B_k$ are defined as follows:

$$A_k = r_k \cdot \phi_k$$

$$B_k = r_k$$

These calculated attributes $A_k$, $B_k$ are allocated to the vertices $x_k$, $y_k$. Therefore it is e.g., provided a list comprising two columns, wherein the first column contains pairs of Cartesian coordinates $x_k$, $y_k$ for each vertex and the second column contains pairs of the corresponding attributes $A_k$, $B_k$.

For coordinate pairs $x_i$, $y_i$ which are within the triangular shaped area, defined by the vertices $x_k$, $y_k$ the attributes $A_i$, $B_i$ are determined by performing an interpolation of these attributes $A_i$, $B_i$ of the current pixel $x_i$, $y_i$ with respect to their position to the vertices $x_k$, $y_k$ of the triangular shaped area and thus with respect to the values of the attributes $A_k$, $B_k$ of the vertices $x_k$, $y_k$.

Finally, the polar coordinates $r_i$, $\phi_i$ can be received from the interpolated attributes $A_i$, $B_i$. The second attribute $B_i$ is the interpolated radius and the interpolated angle $\phi_i$ is received by dividing the corresponding first attribute $A_i$ by the corresponding second attribute $B_i$. Therefore angle $\phi_i$ and the radius $A_i$ are calculated by the following equation:

$$r_i = B_i$$

$$\phi_i = A_i / B_i$$

The calculation of the attributes $A_i$, $B_i$ is performed for the current coordinate pair $x_i$, $y_i$ which lay within the triangular shaped area or at the border of the triangular shaped area. Additionally, it might be possible, for some exceptions to also perform a calculation of attributes $A_i$, $B_i$ of coordinates $x_i$, $y_i$, which lay at least slightly outside the triangular shaped area. In this case, the interpolation of the attributes is rather an extrapolation.

A bilinear parameter interpolation within a triangle is known in the state of art. One way for performing this bilinear interpolation is by calculating the following equation:

$$t(x,y) = \vec{v} M^{-1} \vec{t}$$

According to this equation, $t(x, y)$ is the interpolated parameter. The vector $\vec{v}$ is a line vector, comprising the coordinates $x$, $y$ to be interpolated and a 1:

$$\vec{v} = (x, y, 1)$$

The matrix M comprises the positions of the three vertices as follows:

$$M = \begin{bmatrix} x_0 & y_0 & 1 \\ x_1 & y_1 & 1 \\ x_2 & y_2 & 1 \end{bmatrix}$$

The vector $\vec{t}$ is a column vector comprising the attributes $t_0$ to $t_2$ of the three vertices:

$$\vec{t} = \begin{bmatrix} t_0 \\ t_1 \\ t_2 \end{bmatrix}$$

Thus, for calculating the attribute $t(x, y)$, the line vector $\vec{v}$ is multiplied with the inverse of the matrix M. The result of this multiplication is a line vector, which is multiplied with a column vector $\vec{t}$.

For calculating two attributes of a pixel within the triangle the described bilinear interpolation could be executed for each attribute. Alternatively, the vector $\vec{t}$ can be extended into a matrix comprising one column per attribute to be interpolated. As a result, t (x, y) will not be a scalar but a line vector comprising one element per interpolated attribute.

As described, the radius $r_i$ may be set to the value of $B_i$. This way, the radius $r_i$ is also interpolated with respect to the position of the corresponding coordinate pair within the triangular shaped area. But also a different way of determining $r_i$ can be used, as e.g., directly calculating the radius $r_i$ of the Cartesian coordinates $x_i$, $y_i$ using the well known formula: $r_i=\sqrt{x_i^2+y_i^2}$.

For calculating and thus transforming a plurality of coordinates, interpolating the attributes $A_i$ and $B_i$ for a current coordinate pair and calculating the angle $\phi_i$ of the interpolated attributes and calculating the radius $r_i$ are repeatedly performed. The repeatedly performed calculation might of course comprise setting the radius $r_i$ to the value of the interpolated attribute $B_i$ or calculating the radius $r_i$ in a different way.

In particular, the transformation is focused on transferring data of each pixel given in polar coordinates to a corresponding pixel given in Cartesian coordinates. This data is e.g., the color and alternatively or additionally a brightness of the corresponding pixel. Transforming data of an image given in polar coordinates into an image given in Cartesian coordinates and also for transforming an image given in Cartesian coordinates into an image given in polar coordinates is basically performed in the same way. For the transformation, it is started in the image given in Cartesian coordinates, by defining a triangular shaped area, as described above and finally the polar coordinates are calculated for each Cartesian coordinate. The only difference of the direction of the transformation is, if the data from the given Cartesian coordinates is transferred and allocated to the polar coordinates or the data is transferred from the calculated polar coordinates to the given Cartesian coordinates.

According to one embodiment, the second image is not covered by one single triangular shaped area, but the second image is subdivided in a plurality of triangular shaped areas. In this case, the transformation is executed for one triangular shaped area after another. Thus, a first triangular shaped area is defined by Cartesian coordinates, the polar coordinates for these three vertices are calculated and the first and second attributes are calculated and allocated to the vertices. For the first triangular shaped area the coordinates of this triangular shaped area are each transformed, until all coordinates of this triangular shaped area have been transformed and thus the triangular shaped area has been transformed. Thereafter, a further triangular shaped area is defined and all coordinates are transformed. This way, one triangular shaped area after another is transformed, until the complete image is transformed.

According to one embodiment the first image is a radar scan image or video and the angle $\phi_i$ corresponds to an angle of the position of a radar antenna and the radius $r_i$ corresponds to a distance to the antenna. In this case, a triangular shaped area can be defined by putting one vertex to the center of the circle of the radar scan image or video and let two side of the triangular shaped area correspond to two sides of a sector of the circle. In this case, the edge of the triangular shaped area, which is positioned opposite to the vertex being in the center of the circle can be a tangent or secant of the outer circle. When this edge is a tangent of the circle, some pixels appear to lay between the edge of the triangular shaped area and the outer circle. These pixels do not have to be transformed then. If the edge is a secant of the circle, there are some pixels left, which are outside the triangular shaped area but within the circle. These pixels might be considered by performing an extrapolation instead of an interpolation, or the accuracy might not afford an additional interpolation.

According to one embodiment, sectors of a radar scan circle are further subdivided by providing further concentric circles of different radius. By providing these additional circuits, a sector of the outer circle is than subdivided into one basically triangular shaped area having one vertex in the center of the circles and at least one further quadrangle area, having four vertices each. In this case, the quadrangles are further subdivided into at least two triangular shaped areas each. In the end, each sector is subdivided into a plurality of triangular shaped areas, and thus the transformation can be performed as described above.

According to another embodiment, the transformation is performed on at least one radar video composed of a plurality of images by repeatedly executing the transformation on the images. A radar scan video is received by receiving continuously or almost continuously one data set after the next data set transferring data received from the radar antenna or a radar receiver into a memory for displaying. Thus, data currently received depends on the actual angle of the radar antenna. The received data therefore corresponds to a sector of a circle and the next set of data received for the next value of the angle corresponds to a sector adjacent to the sector of the previous data set. In other words, the received data corresponds to a sector rotating within that circle.

To transform this radar video, the current sector is subdivided by providing further concentric circles having smaller radius and thus subdividing the current sector into segments comprising 4 vertices. These segments are each divided into two triangular shaped areas each by providing a diagonal line. For each of these triangular shaped areas, a transformation can than be executed as described above. The segment of the current sector located between the center of circles and the smallest circle is already defined as a triangular shaped area. For small angles, each arc of the circles of the current sector can be approximated by a strait line.

Advantageously, one embodiment of the described method is performed by subdividing the image as e.g., subdividing a sector into triangular shaped areas by one microprocessor, e.g., the main processor of a computing unit. These triangular shaped areas are defined each by the Cartesian coordinates of the vertices. The attributes $A_k$, $B_k$ can also be calculated on this one processor and allocated to each vertex. The interpolation of each coordinate pair within in the triangular shaped area is then performed by a graphics card. For executing this interpolation the graphics card needs the coordinates of the three vertices and the allocated attributes. The graphics card can then perform the interpolation of the attributes for all coordinates within the triangular shaped area, calculate the polar coordinates and adapt the store for the display pixels in Cartesian coordinates (Cartesian store).

The advantage of outsourcing the interpolation of the attributes to a graphics card is based on the fact, that some graphics cards are especially adapted for performing interpolations on images. Some known graphics cards perform an interpolation on graphical characteristics as brightness or color. The reason for this ability of graphics cards is, that usually images are composed of a plurality of triangular shape areas. The vertex pixels of these triangular shaped areas are provided for the graphics card including the characteristics of these pixels. For displaying, the graphics card then interpolates these characteristics within each triangular shaped area, to achieve a continuously appearance of this characteristics, e.g., provide a continuously change of the brightness within the triangular shaped area instead of a stepwise change.

Even though a possibility to perform the interpolation is described above, by providing formulas, it is not necessary, to know how the interpolation works in detail, if the interpolation is performed by a graphics card as described above. All one has to know is, which information to conduct to the graphics card and control the interpolation and calculation in the graphics card.

Accordingly, an embodiment of the present invention makes use of the ability of graphics cards to perform interpolation for graphical aspects by giving information about corresponding polar coordinates to perform an interpolation on this information instead of the graphical aspects.

According to a further aspect of the present invention, it is provided a method for displaying a radar scan image or video, composed of a plurality of radar scan images given in polar coordinates and given in a first plane, in a display plane. According to this, a first radar scan image or video given in polar coordinates is transformed into a second image or video given in Cartesian coordinates (world coordinates) and additionally into a display plane (screen coordinates). This transformation is performed as described above, whereby only coordinates of vertices are actually transformed but the majority of coordinates is then calculated by performing an interpolation with respect to the transformed vertices.

This method is advantageously for displaying at least one radar scan image and additional geographical data in one display plane. Geographical data such as a map comprising topographical data is projected from the earth surface onto a plane like a map. For locating further objects, especially moving objects detected by a radar as a position relative to the geographical data, the radar scan image or video and the geographical data is displayed in one plane. Usually, the plane of the radar scan image and the plane of the projected geographical data do not match. Therefore, a common plane is chosen as a display plane and the geographical data is projected into this display plane or projected geographical data is transformed into this display plane and the radar scan image or video is also transformed into this display plane. If one or more additional radar systems provide additional radar scan images or videos, these additional radar scan images or videos can also be transformed into the common display plane, by subdividing each image or video into triangles defined by vertices, transforming the vertices into Cartesian coordinates and into the display plane and finally calculating all other coordinates by performing a bilinear interpolation.

According to one embodiment, the plane of the geographical data matches the display plane. In other words the radar scan image or video or the radar scan images or videos are transformed into the plane of the geographical data. This geographical data might be provided as a map in digitalized form in a computer or a unit for displaying as a digital map.

Transformation within two planes might include a transformation with respect to the kind of projection used within each plane. Especially the projection of geographical data, defined in latitude and longitude, into a plane will be considered.

By using this method, also two or more radar scan images or videos of different radar scan systems can be displayed in one display plane. It is of course not necessary, to display additional geographic data, but it is usually desired to also display geographical data on the same display.

In rare cases it might be desired, to display at least one radar scan image or video and an additional radar scan image or video or additional geographical data on a display, wherein the positions on this display are defined by polar coordinates (polar display). In this case, for the data to be displayed vertices of triangles are transformed into the display plane, given in Cartesian coordinates and then in a further step transformed from Cartesian coordinates into polar coordinates. Subsequently, all other coordinates will be calculated by performing an interpolation based on the transformed vertices. The one radar scan image or video, already given in a format to be displayed on that polar display can of course be left unchanged.

The transformation can be performed as described above, involving an interpolation. Especially when using a graphics card for performing the step of interpolating the process of transformation might achieve an efficiency sufficient to allow the transformation being executed in real time. This means, that a data set received from the radar antenna or receiver can be transformed from polar coordinates into Cartesian coordinates before the next data set is received. Or the transformation is performed within a time e.g., within 0.3 seconds, that a human would hardly realize the delay of receiving data and visualizing it.

The described methods for transforming and displaying may be advantageously performed by involving a computer program, comprising computer program code means for causing a computer or a graphics card to perform dividing at least part of an image into at least one triangular shaped area, determining the polar coordinates for the vertices of the triangular shaped area, calculating the attributes $A_k$, $B_k$ of the vertices of the triangular shaped area and allocating this attributes to the vertices of the triangular shaped area. Additionally, the computer program may control to transfer the triangular shaped area given in Cartesian coordinates and providing attributes $A_k$, $B_k$ for each vertex to a graphics card and make the graphics card perform the interpolation for each coordinate pair within the triangular shaped area. Finally, the computer program calculates the angle $r_i$ and the radius $\phi_i$ of the interpolated attributes and allocates data of each coordinate pair of the triangular shaped area given in Cartesian coordinates to respective polar coordinates, or allocating data as brightness or color of the polar coordinates $r_i$, $\phi_i$ to the Cartesian coordinates $x_i$, $y_i$. Finally, the thus transformed triangular shaped area is displayed or assembled to an image and then displayed.

Advantageously, the transformation is performed within a radar scan converter. Thus, according to one embodiment of the present invention, a radar scan converter is provided for transforming a radar scan image or radar scan video given in polar coordinates into an image or video given in Cartesian coordinates or vice versa. This radar scan converter comprises a transformation unit for transforming coordinates of a first image given in polar coordinates into coordinates of a second image given in Cartesian coordinates or vice versa. This transformation unit can be a computer or processor. The radar scan converter comprises division means for dividing at least part of the second image into at least one triangular shaped area. This division means can also be a processor or computer and it can be integrated with the transformation unit in one processor or computer. The radar scan converter also comprises determination means for determining for the Cartesian coordinates of the vertices the corresponding polar coordinates. These determination means can e.g., be a processor and a memory comprising a look up table. There are also provided allocation means for allocating attributes $A_k$, $B_k$, determined, as e.g., calculated of the polar coordinates $r_k$, $\phi_k$ to the vertices. This computing means and allocation means can each be a processor or computer on its own or be integrated in the provided processor or computer. The radar scan converter further comprises interpolating means for performing the interpolation for the attributes $A_i$, $B_i$. The interpolation means is usually provided as a graphics card. The interpolating means can also be integrated in a computer. A calculating means can be a graphics card and is provided for calculating the angle $\phi_i$ of a current coordinate pair of the interpolated attributes $A_i$, $B_i$ by dividing $A_i$ by $B_i$. For displaying the transformed radar scan image or video, the radar scan converter can also comprise a display.

Further embodiments are described herein.

Any described features, including the features of the claims, may be combined with any other described features, even when such a combination is not clearly indicated by the references in the claims or other parts of this disclosure.

These and other characteristics, features and advantages of the various embodiments of present invention will become apparent from the following detailed description, taken in conjunction with the accompanying drawings, which illustrate, by way of example, the principles of the invention. This description is given for the sake of example only, without limiting the scope of the invention. The reference figures coded below refer to the attached drawings.

BRIEF DESCRIPTION OF THE SEVERAL VIEWS OF DRAWINGS

DETAILED DESCRIPTION

Figure 1:
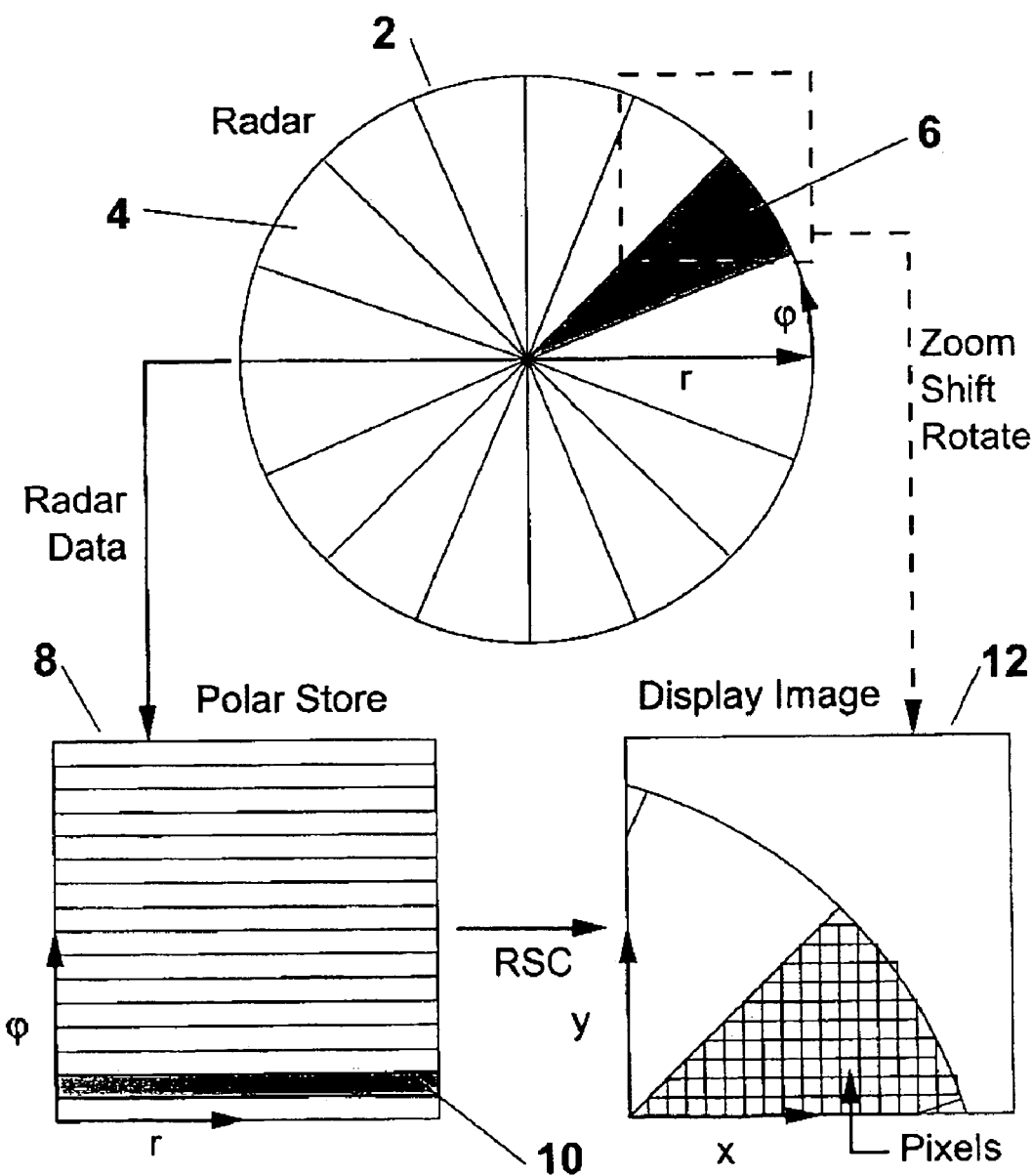
FIG. 1 is a schematic drawing, illustrating the principles of converting a radar scan image from polar coordinates into Cartesian coordinates according to the prior art.

The present invention will be described with respect to one or more embodiments and with reference to certain drawings but the invention is not limited thereto but only by the claims. The drawings described are only schematic and are non limiting. In the drawings, the size of some of the elements may be exaggerated and not drawn on scale for illustrative purposes. Where the term "comprising" is used in the present description and claims, it does not exclude other elements or steps.

In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 shows a circle 2 subdivided in a plurality of sectors 4, which is representative for the radar scan data to be transformed. The radar data of this circle 2 is given in polar coordinates r, $\phi$. The active or current sector 6 is highlighted. The radar scan data illustrated as the circle 2 is stored in a polar store 8, which is a two-dimensional array of the polar coordinates r and $\phi$. Therefore, the highlighted current sector 6 is represented in the polar store as a stripe like area 10 covering a part of the range of the angle $\phi$ and covering the complete range of the radius r. For each coordinate defined by r and $\phi$ a value is stored into the polar store. This value stands for example for the brightness or color of each pixel.

For transforming the radar scan data given in polar coordinates into Cartesian coordinates, the corresponding polar coordinates are calculated. Having calculated this corresponding polar coordinates, the corresponding value is received from the position in the polar store defined by the polar coordinates $r_i$, $\phi_i$. The found value is then transferred to the corresponding position in the Cartesian display image and thus stored into a corresponding position in a Cartesian store. It is to be noted, that transformed polar coordinates usually do not exactly match a position defined by $r_i$, $\phi_i$ in the polar store. Therefore, a position defined by $\phi$, r within the polar store is taken, which is closest to the transformed positions $r_i$, $\phi_i$. In other words, $r_i$ and $\phi_i$ of the polar store rather define an area within a radial image rather than an exact position.

The radar supplies its measured data in polar coordinates r, $\phi$ directly from a rotating radar antenna. The radius r defines the target/echo distance and $\phi$ the target angle in polar world coordinates. These data are measured, digitized and stored in a polar coordinate "polar store". The main reverse scan conversion (RCS) task is to convert this data to Cartesian display coordinates x, y, creating the necessary display pixels, employing a graphical processing unit (GPU).

Additionally, the radar scan conversion process is influenced by the current zoom, shift and rotation settings defining which part of the "world" shall be visible in the display image. Therefore, the pixels in the display image cover a certain area, as illustrated by the small squares.

Figure 2:
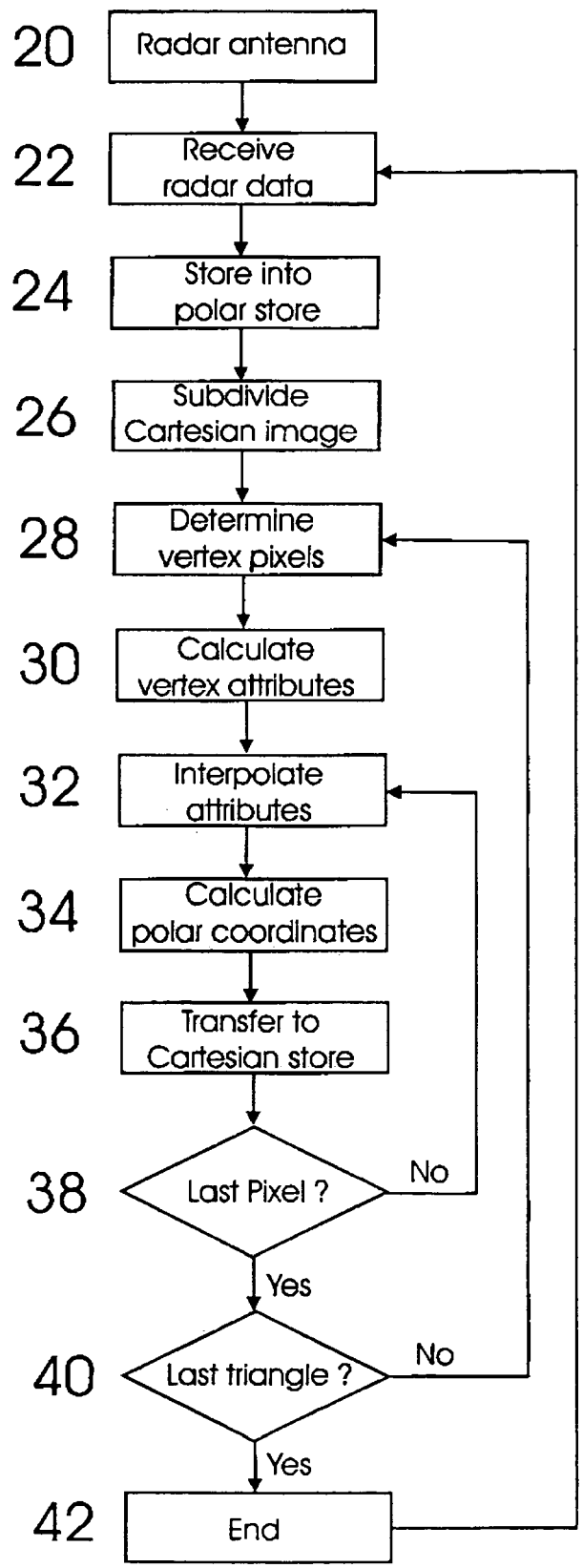
FIG. 2 is a flow chart describing an embodiment of a method for transforming radar scan data received in polar coordinates into Cartesian coordinates.

According to the embodiment illustrated in FIG. 2, radar data is received from a radar antenna or receiver 20 in the first computation step according to block 22. The received radar data is then, according to block 24 stored into the polar store.

In a next step according to block 26, the display image or Cartesian image is subdivided into a plurality of triangular shaped areas. This step of subdividing can be performed with respect to the current angle of the radar scan. Therefore, according to step 26 a sector of the circle of the display image is subdivided into a plurality of triangular shaped areas. If a low resolution is needed only, the current sector as such might be taken as one triangular shaped area, without performing any further subdividing of this sector.

The radar image or video will be subdivided into triangular shaped areas. Communication with the graphics card can be performed using OpenGL (open graphics library)or Direct3D API (application programmers interface). The accuracy of the transformation can be controlled by adapting the size of the triangular shaped areas. Therefore, a single or a few transformations of coordinates are precisely calculated by using the above described equations and will be compared with the corresponding coordinates transformed by interpolation. If the difference is above a predetermined value the size of the triangular shaped areas will be reduced. Accordingly, the size of the triangular shaped areas may be increased, if the described difference is below a further predetermined value.

The subdivided triangular shaped areas are defined by the vertices given in Cartesian coordinates $x_k$, $y_k$. These Cartesian coordinates $x_k$, $y_k$ are each transformed in the polar coordinates $\phi_k$, $r_k$ according to the determination block 28.

In the next step according to block 30, the attributes $A_k$, $B_k$ are calculated for each vertex of the current triangular shaped area. According to this calculation $A_k$ equals the product of $\phi_k$ and $r_k$ ($A_k = \phi_k \cdot r_k$) and $B_k$ equals the radius $r_k$ ($B_k = r_k$). These attributes $A_k$, $B_k$ are also attached each to the corresponding Cartesian coordinates of the vertices of the current triangular shaped area. As a result, three vertices defining a triangular shaped area given in Cartesian coordinates are provided, each having two attributes $A_k$, $B_k$ attached, wherein the index k goes from 0 to 2.

According to block 32, a bilinear interpolation is performed to interpolate the attributes $A_i$, $B_i$ of the first coordinate pair within the triangular shaped area. The corresponding polar coordinates of this transformed coordinate pair will be calculated in the next step according to block 34, whereby, the radius $r_i$ equals the attribute $B_i$ ($r_i = B_i$) and the angle $\phi_i$ equals the division of $A_i$ and $B_i$ ($\phi_i = A_i/B_i$).

After the polar coordinates of this first Cartesian coordinate pair have been calculated, the corresponding value is received off the polar store and is inserted into the Cartesian store for the display image according to block 36.

Now, the first coordinate pair has been transformed and the interpolation can be performed for the next coordinate pair within the triangular shaped area. Therefore, in block 38 it is checked, whether the transformation has already been fulfilled on the last coordinate pair of the current triangle. If this not the case, the interpolation is execute for the next coordinate pair within the triangular shaped area and thus it will be returned to block 32 to transform the next coordinate pair. Within this loop, the values of the three vertices can also be read out of the polar store and be written into the Cartesian store for displaying the image.

After the transformation has been executed on all coordinates within a certain triangle, the method continues according to block 38 to block 40, to check whether the transformation has been fulfilled for all subdivided triangular shaped areas. If the transformation has not yet been performed on all triangular shaped areas, the method will start again to determine the polar coordinates of the vertices of the next triangular shaped area according to block 28.

After all triangular shaped areas have been transformed, the method is basically completed and the end-block 42 has been reached. The method can now start again with receiving new radar data from the radar antenna or receiver 20 according to block 22 and store the received data into the polar store according to block 24. For example, data of the next scanned sector can be transformed. In Block 26, the method will then take the next sector and execute the transformation on the radar data according to this next sector.

For displaying the radar data transformed into Cartesian coordinates, the values stored in the Cartesian store just have to be displayed according to their position within this store.

Figure 3:
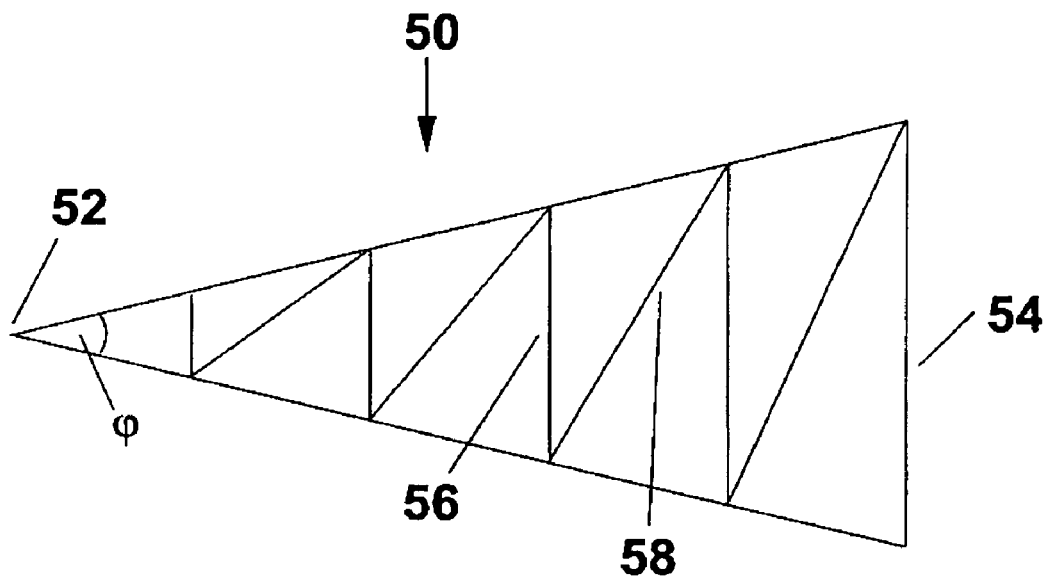
FIG. 3 is a schematic drawing, illustrating one embodiment of the subdividing of a sector of a radar scan video into a set of triangles.

Subdividing a sector is illustrated according to FIG. 3. The sector 50 comprises one vertex 52 which is allocated in the center of the circle. The line 54 represents an arc of the circle. If the angle $\phi$ of this sector 50 is small enough, then the accuracy of the approximation of the corresponding arc by the line 54 can be sufficient.

Figure 4:
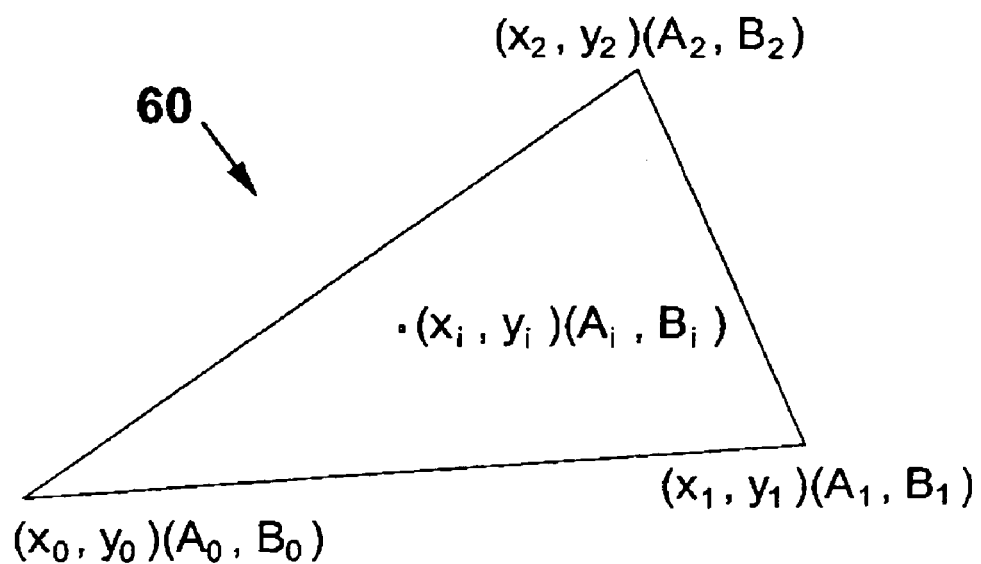
FIG. 4 is a schematic drawing illustrating how to prepare a triangular shaped area for interpolating the polar coordinates within this triangle according to an embodiment.

As illustrated in FIG. 4, for subdividing the shown sector 50 into a plurality of triangles the sector 50 is first subdivided by applying concentric circles with smaller radius than the main circle. The corresponding arcs of these added concentric circles are represented by lines 56. According to this step, the sector 50 is subdivided into four quadrangles according to this example, and one triangle comprising the centre vertex 52. For further subdividing the quadrangles into triangles, lines 58 are inserted in each quadrangle. These lines 58 basically extend through the quadrangle as a diagonal. As a result, the sector 50 shown in this illustrative example is divided into nine triangles.

For performing the bilinear interpolation, a triangle 60 is defined by three vertices given in Cartesian coordinates $x_k$, $y_k$, whereby according to the illustration of FIG. 4 k takes the values 0 to 2. Additionally, the attributes $A_k$ and $B_k$ are attached to each of these vertices. Starting from these three vertices and the attached attributes, the interpolation can be performed for any Cartesian coordinates $x_i$, $y_i$ to calculate the attributes $A_i$, $B_i$. Even though FIG. 4 only shows one current coordinate pair $x_i$, $y_i$ with interpolated attributes $A_i$, $B_i$, the interpolation is performed for all coordinates within the triangle 60.

Figure 5:
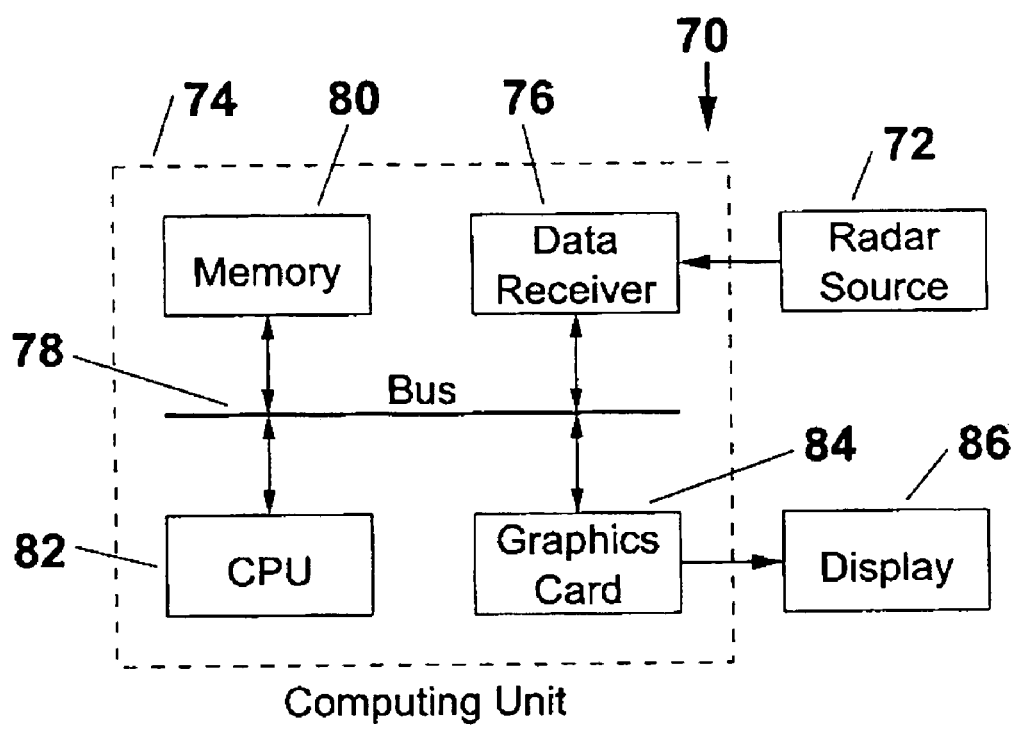
FIG. 5 shows the structure of an embodiment of a radar scan converter in a schematic way.

The radar scan converter 70 according to FIG. 5 receives its data from a radar source 72 as a radar antenna. The radar data is inputted form the radar source 72 into the computing unit 74. Within the computing unit 74, the radar data reaches the data receiver 76 which is connected to a bus 78. From the data receiver 76 the radar data, which is given in polar coordinates, is transferred via the bus 78 to a graphics card 84, wherein the received data is stored into a polar store. The data may also be cached in the memory 80. The data receiver 76 further transfers the current angle range of the current radar scan to the central processing unit (CPU) 82. According to this current angle range, the current sector can be defined by the CPU 82. The CPU then subdivides the sector into a plurality of triangles and defines the vertices of these triangles in Cartesian coordinates. Subsequently, the attributes $A_k$, $B_k$ are calculated and attached to the vertices of the triangle.

Choosing a sector, subdividing the sector into a plurality of triangles, defining the vertices of the triangles and calculating and attaching the attributes $A_k$, $B_k$ to each vertex can be performed by providing and using a look up table which already comprises the sectors with their vertices $x_k$, $y_k$ and the attached attributes $A_k$, $B_k$. Thus, one triangle after another, defined as described above can be transferred from a look up table within the memory 80 using the bus 78 to the graphics card 84. The graphics card 84 can then perform the interpolation for each coordinate pair within the triangle. The polar coordinates $r_i$, $\phi_i$ are then calculated from the interpolated attributes $A_i$, $B_i$ and the value of the polar store which is related to the current polar coordinates $r_i$, $\phi_i$ is transferred to a Cartesian store for the image in Cartesian coordinates to be displayed. The graphics card 84 can then shift the content of the Cartesian store to the display 86 to generate an image.

The CPU also basically controls the computing unit 74, and in particular the CPU 82 controls the performing of the transformation and finally displaying in general.

The embodiment(s) of the present invention thus provides a method for transforming a radar image and video from polar coordinates into Cartesian coordinates. Therefore, the target image in Cartesian coordinates is subdivided into triangles defined by the vertices given in Cartesian coordinates. The respective polar coordinates are coded into attributes and attached to each vertex. The attributes of any coordinates within the triangle are calculated by performing a bilinear interpolation on a graphics card and the polar coordinates are calculated from these attributes. Finally, the characteristics of the coordinates of the image in polar coordinates are transferred to the corresponding Cartesian coordinates of the target image. Using this method, one or a plurality of radar scan images of one or a plurality of radar antennas can be displayed with additional geographical data in one display plane, by transforming the radar image given in polar coordinates into Cartesian coordinates and further into the display plane. The methods may be performed by a computer program, and the described methods may be implemented in a radar scan converter.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for transforming a first image given in polar coordinates $r_i$, $\phi_i$ into a second image given in Cartesian coordinates $x_i$, $y_i$, or vice versa, the method comprising:
    a. dividing at least part of the first or second image, into at least one triangular shaped area, having three vertices;
    b. determining for the vertices polar coordinates $r_k$, $\phi_k$ of the first image and respective Cartesian coordinates $x_k$, $y_k$ of the second image;
    c. allocating first and second attributes $A_k$ and $B_k$ to the vertices $x_k$, $y_k$, wherein the first attribute $A_k$ is the product of $\phi_k$ and $r_k$ and wherein the second attribute $B_k$ equals $r_k$;
    d. calculating attributes $A_i$ and $B_i$ for at least one current coordinate pair $x_i$, $y_i$ of the second image from the attributes $A_k$, $B_k$ of the vertices $x_k$, $y_k$ of a triangular shaped area by an interpolation with respect to the position of the current coordinate pair $x_i$, $y_i$ relative to the vertices of the triangular shaped area; and
    e. calculating the angle $\phi_i$ of a current coordinate pair $r_i$, $\phi_i$ of the first image, corresponding to the current coordinate pair $x_i$, $y_i$ of the second image by dividing the first attribute $A_i$ by the second attribute $B_i$.

2. The method according to claim 1 wherein in e., the radius $r_i$ is set to the value of $B_i$.

3. The method according to claim 1 wherein d. and e. are repeatedly executed for calculating and thus transforming a plurality of coordinates.

4. The method according to claim 1 wherein a.-e. are repeatedly executed for transforming a plurality of triangular shaped areas.

5. The method according to claim 1 wherein data of a pixel at a current coordinate pair of the first or second image to be transformed, in particular a color and a brightness, is allocated to a pixel at the corresponding coordinate pair of the second or first image respectively.

6. The method according to claim 1 wherein a bilinear interpolation is used for the interpolation.

7. The method according to claim 1 wherein the interpolation is executed by a graphics card.

8. The method according to claim 1 wherein the first image is a radar scan image or video, comprised of a plurality of images, and the angle $\phi_i$ corresponds to an angle of the position of a radar antenna and the radius $r_i$ corresponds to a distance to the antenna.

9. The method according to claim 8 wherein the transformation is executed on at least one radar video composed of a plurality of images by repeatedly executing the transformation on the images.

10. The method according to claim 8 wherein one vertex of the triangular shaped area corresponds to the center of a circle of the radar scan image or video, and two sides of the triangular shaped area correspond at least partially to two sides of a sector of said circle.

11. A method for transforming a first radar scan image or video, comprised of a plurality of images, given in polar coordinates $\phi_i$, $r_i$ into a second image or video given in Cartesian coordinates $x_i$, $y_i$, or vice versa, the method comprising:
    a. dividing at least part of the second image, into at least one triangular shaped area, having three vertices, defined by Cartesian coordinates $x_k$, $y_k$;
    b. determining for the Cartesian coordinates $x_k$, $y_k$ of the vertices of the second image polar coordinates $\phi_k$, $r_k$ of the first image;
    c. allocating first and second attributes $A_k$ and $B_k$ to the vertices $x_k$, $y_k$, wherein the first attribute $A_k$ is the product of $\phi_k$ and $r_k$ and wherein the second attribute $B_k$ equals $r_k$;
    d. calculating attributes $A_i$ and $B_i$ for at least one current coordinate pair $x_i$, $y_i$ of the second image from the attributes $A_k$, $B_k$ of the vertices $x_k$, $y_k$ of a triangular shaped area by an bilinear interpolation with respect to the position of the current coordinate pair $x_i$, $y_i$ relative to the vertices of the triangular shaped area, whereby the bilinear interpolation is executed by a graphics card;
    e. calculating the angle $\phi_i$ of a current coordinate pair $\phi_i$, $r_i$ of the first image, corresponding to a current coordinate pair $x_i$, $y_i$ of the second image by dividing the first attribute $A_i$ by the second attribute $B_i$;
    f. setting the radius $r_i$ to the value of $B_i$;
    g. repeating the steps d. to f. for calculating and thus transforming a plurality of coordinates;
    h. repeating the steps a. to g. for transforming a plurality of triangular shaped areas; and
    i. allocating data of a pixel at each current coordinate pair of the first image, in particular a color and brightness to pixels at each corresponding current coordinate pair of the second image.

12. A method for displaying a radar scan image or video, comprised of a plurality of radar scan images, given in polar coordinates and given in a first plane, in a display plane in Cartesian coordinates, the method comprising:

a. dividing at least part of a first or second image or video, given in polar coordinates or Cartesian coordinates respectively and given in the first plane, into at least one triangular shaped area, having three vertices, defined by Cartesian coordinates $x_k$, $y_k$;

b. determining for the vertices polar coordinates $r_k$, $\phi_k$ of the first image or video and respective Cartesian coordinates $x_k$, $y_k$ of the second image or video;

c. allocating first and second attributes $A_k$ and $B_k$ to the vertices $x_k$, $y_k$, wherein the first attribute $A_k$ is the product of $\phi_k$ and $r_k$ and wherein the second attribute $B_k$ equals $r_k$;

d. transforming the vertices of the second image or video of the first plane, transformed into Cartesian coordinates, into vertices $x'_k$, $y'_k$ of the display plane, unless the first plane is identical to the display plane;

e. allocating the attributes $A_k$ and $B_k$ as determined according to step c. to the vertices $x'_k$, $y'_k$ of the display plane;

f. calculating attributes $A_i$ and $B_i$ for at least one current coordinate pair $x_i$, $y_i$ of the second image or video in the display plane from the attributes $A_k$, $B_k$ of the vertices $x'_k$, $y'_k$ by an interpolation with respect to the position of the current coordinate pair $x'_i$, $y'_i$ relative to the vertices $x'_k$, $y'_k$; and g. calculating the angle $\phi_i$ of a current coordinate pair $\phi_i$, $r_i$ of the first radar scan image or video, corresponding to the current coordinate pair $x'_i$, $y'_i$ of the second radar scan image or video in the display plane by dividing the first attribute $A_i$ by the second attribute $B_i$.

13. The method according to claim 12 wherein geographical data is projected into the display plane or projected geographical data is transformed into the display plane.

14. The method according to claim 12 wherein at least a further radar scan image or video, given in polar coordinates and given in a further plane, is transformed into Cartesian coordinates and into the display plane, unless the further plane is identical to the display plane.

15. The method according to claim 12 wherein the vertices are further transformed from the display plane, given in Cartesian coordinates into polar coordinates of a further image or video, and attributes $A_i$, $B_i$ are calculated with respect to the position of the current coordinates, relative to the vertices transformed into polar coordinates of the further radar image or video.

16. The method according to claim 12 wherein the display plane matches the first plane of the radar scan image or video.

17. A method for displaying a radar scan image or video, comprised of a plurality of radar scan images, the radar scan image or video being given in a first plane, and geographical data, in one display plane, the method comprising:

a. projecting the geographical data into the first plane or transforming projected geographical data into the first plane; and b. transforming the projected and transformed geographical data given as a first geographical image in Cartesian coordinates $x_i$, $y_i$, into a second geographical image given in polar coordinates $r_i$, $\phi_i$, by transforming the coordinates of the first geographical image into coordinates of the second geographical image, by i. dividing at least part of the first or second geographical image, into at least one triangular shaped area, having three vertices;

ii. determining for the vertices polar coordinates $\phi_k$, $r_k$ of the second geographical image and respective Cartesian coordinates $x_k$, $y_k$ of the first geographical image;

iii. allocating first and second attributes $A_k$ and $B_k$ to the vertices $x_k$, $y_k$, wherein the first attribute $A_k$ is the product of $\phi_k$ and $r_k$ and wherein the second attribute $B_k$ equals $r_k$;

iv. calculating attributes $A_i$ and $B_i$ for at least one current coordinate pair $x_i$, $y_i$ of the first geographical image from the attributes $A_k$, $B_k$ of the vertices $x_k$, $y_k$ of a triangular shaped area by an interpolation with respect to the position of the current coordinate pair $x_i$, $y_i$ relative to the vertices of the triangular shaped area; and v. calculating the angle $\phi_i$ of a current coordinate pair $r_i$, $\phi_i$ of the second geographical image, corresponding to the current coordinate pair $x_i$, $y_i$ of the first geographical image by dividing the first attribute $A_i$ by the second attribute $B_i$.

18. A method for displaying a radar video given in polar coordinates and given in a first plane, and geographical data in a display plane, the method comprising:

a. projecting the geographical data into the display plane or transforming projected geographical data into the display plane;

b. transforming the radar scan video from polar coordinates into Cartesian coordinates; and c. transforming the radar scan image or video from the first plane into the display plane.

19. The method according to claim 18 wherein a further radar video given in polar coordinates and given in a second plane is displayed in the display plane, the method further comprising:

a. transforming the further radar scan video from polar coordinates into Cartesian coordinates; and b. transforming the transformed further radar scan video from the second plane into the display plane.

20. An article of manufacture, comprising:

a computer program for transforming a radar scan image or radar scan video given in polar coordinates into an image or video given in Cartesian coordinates or vice versa, and having stored thereon:

computer program code means for causing a computer to perform the method as claimed in claim 1, when said computer program is run on a computer.

21. A radar scan converter for transforming a radar scan image or radar scan video given in polar coordinates into an image or video given in Cartesian coordinates or vice versa, the apparatus comprising:

a. a transformation unit for transforming coordinates of a first image given in polar coordinates $r_i$, $\phi_i$ into coordinates of a second image, given in Cartesian coordinates $x_i$, $y_i$, or vice versa;

b. division means for dividing at least part of the first or second image, into at least one triangular shaped area, having three vertices;

c. determination means for determining for the vertices polar coordinates $r_k$, $\phi_k$ of the first image or video and respective Cartesian coordinates $x_k$, $y_k$ of the second image or video;

d. allocation means for allocating first and second attributes $A_k$ and $B_k$ to the vertices $x_k$, $y_k$, wherein the first attribute $A_k$ is the product of $\phi_k$ and $r_k$ and wherein the second attribute $B_k$ equals $r_k$;

e. interpolation means for calculating attributes $A_i$ and $B_i$ for at least one current coordinate pair $x_i$, $y_i$ of the second image from the attributes $A_k$, $B_k$ of the vertices $x_k$, $y_k$ of a triangular shaped area by an interpolation with respect to the position of the current coordinate pair $x_i$, $y_i$ relative to the vertices of the triangular shaped area; and f. calculating means for calculating the angle $\phi_i$ of a current coordinate pair $\phi_i$, $r_i$ of the first image, corresponding to the current coordinate pair $x_i$, $y_i$ by dividing the first attribute $A_i$ by the second attribute $B_i$.

22. The radar scan converter as claimed in claim 21 wherein a graphics card is provided as the interpolating means.

23. The radar scan converter as claimed in claim 21, further comprising a display for displaying at least one radar scan image or video.

* * * * *